United States Patent
Shami et al.

(10) Patent No.: US 11,048,685 B1
(45) Date of Patent: Jun. 29, 2021

(54) FUNCTION-BASED OBJECT QUERIES

(71) Applicant: Amazon Technologies, Inc., Seattle, WA (US)

(72) Inventors: Usman Ahmed Shami, Sammamish, WA (US); Wei Xiao, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 284 days.

(21) Appl. No.: 15/950,488

(22) Filed: Apr. 11, 2018

Related U.S. Application Data

(62) Division of application No. 14/852,334, filed on Sep. 11, 2015, now Pat. No. 10,592,495.

(51) Int. Cl.
*G06F 16/00* (2019.01)
*G06F 16/23* (2019.01)
*G06F 16/2455* (2019.01)

(52) U.S. Cl.
CPC ...... *G06F 16/2365* (2019.01); *G06F 16/2455* (2019.01)

(58) Field of Classification Search
CPC ....................................................... G06F 16/23
See application file for complete search history.

(56) References Cited

U.S. PATENT DOCUMENTS

2012/0005188 A1   1/2012  Yu et al.
2015/0039587 A1   2/2015  Liu et al.

*Primary Examiner* — Hung Q Pham
(74) *Attorney, Agent, or Firm* — Davis Wright Tremaine LLP

(57) ABSTRACT

A repository of key-value data may store a first object value having an internal structure of a hierarchy of sub-objects. The repository may receive a request to modify the first object, expressed as a function, without side effects, of one or more parameters. Values may be assigned to the one or more parameters by mapping from the parameters to locations in the hierarchy of sub-objects. A second object may be formed based on the return value of the function. The first object may be replaced in the repository by the second object.

20 Claims, 10 Drawing Sheets

FUNCTION-BASED OBJECT QUERIES

CROSS-REFERENCE TO RELATED APPLICATIONS

This application is a divisional of U.S. patent application Ser. No. 14/852,334, filed Sep. 11, 2015, the disclosure of which is incorporated herein by reference.

BACKGROUND

Databases may sometimes be configured to store structured or semi-structured data within a single field. A database may, for example, store a binary file or document in a field at some position within a row of data. When structured or semi-structured data is stored in this manner, conventional database techniques for accessing or updating the data in the field may not be adequate, since the database may not be aware of the data's internal structure. Various other techniques have been used to access or update structured or semi-structured data stored in a database field. However, many of these techniques are complex and unwieldy.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
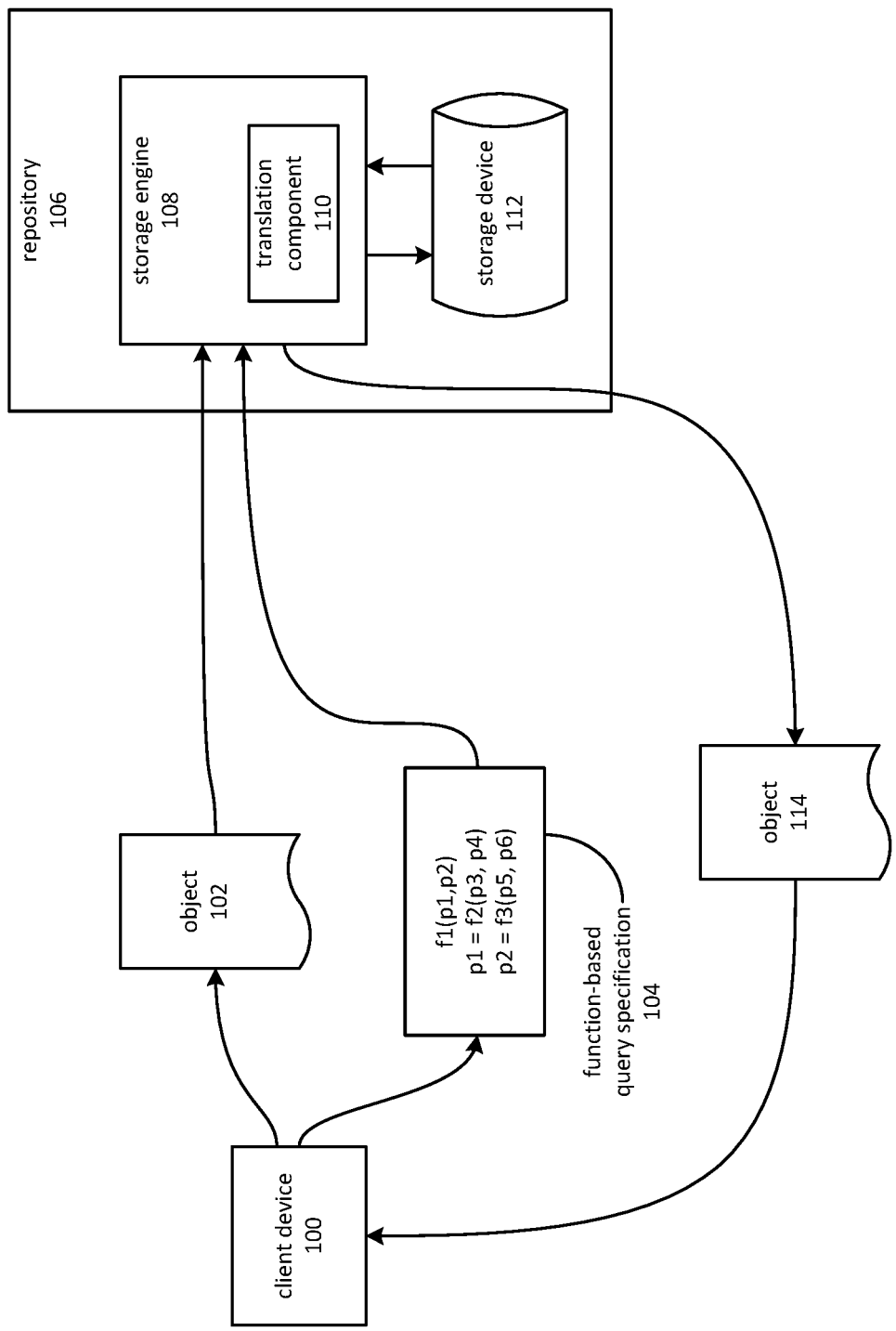
FIG. 1 is a block diagram depicting an example of a system configured as a repository for structured objects.

Disclosed herein are systems, methods, and computer program products for performing queries on structured or semi-structured objects, such as a JavaScript Object Notation ("JSON") objects. Queries of such objects may be based on a query specification that utilizes elements of functional languages, rather than procedural languages or declarative languages such as SQL. Procedural or declarative queries would typically process a JSON or other structured object in-place, meaning that a single copy of the object is loaded into memory and manipulated by a series of operations. When procedural languages are used to specify a query, care must be taken to ensure that operations are expressed in the right order, since changing the order in which the operations are executed could change the results of performing the operations on the object. A similar problem exists with declarative approaches, although in many cases the determination of the correct order is performed by an automated process. Using the function-oriented approach described herein, many of these ordering issues may be avoided since the evaluation of any given function (with limited exceptions) does not cause side effects on the target object. The target object is instead only modified once the top-level function in the query has been fully evaluated.

In an example, a distributed database may comprise computing nodes connected to a storage device on which data managed by the database is stored. The computing nodes may further comprise a memory on which computer-executable instructions are stored. When executed by a processor of the computing nodes, the instructions may cause the distributed database to process requests to store, access, and modify data stored on the system.

The distributed database may process a request to modify a JSON object held in the memory of the storage device. A JSON object possesses an internal structure that comprises a collection of name-value pairs. The values may themselves be objects, resulting in a nested hierarchy of objects and sub-objects. The distributed database may process requests to modify the JSON object. The request may be expressed as a function of one or more parameters. The parameters may be additional functions, literal values, and so forth. In some cases, the parameters may be references to locations within the object. For example, a parameter may refer to a location within a hierarchy of objects and sub-objects. The request to modify the JSON object may therefore comprise a tree of functions that may be evaluated, subject to various optimizations, in bottom-up fashion, ending with the outmost or top-level function. Non-limiting examples of functions that might be employed include those that perform insert, append, and replace operations. Functions that apply conditional operators might also be used, for example to test a condition and cause another function to be evaluated if the tested condition is true.

A component of the distributed database, such as a storage engine, may cause a referenced location of the object to be accessed. To access the referenced location, the storage engine may cause the object to be loaded fully or partially into memory. The value of a function parameter that references the location may then be set, based on the contents of the object at the referenced location. In other words, the reference allows the parameter to be mapped to a location in the object, and the contents of the object at that location may be used to assign a value to a parameter of the function.

The result of the top-level function may be calculated using the assigned parameter values as input. If the top-level function includes parameters whose values are specified in terms of additional functions, these additional functions may be evaluated prior to the top-level function. The output from each lower-level function is supplied as input to a higher-level function. Each function may be evaluated without side effects on the stored object. Moreover, if the object is loaded into memory, it is not modified in place. Parameter values supplied to a function, if they correspond to the object, are copies of the object or some portion thereof. The return value of the top-level function may be a copy of the original object, modified as indicated by the tree of functions.

Once the top-level function has been evaluated, its return value may be used to replace the original JSON object in storage. Note that processing of the tree of functions is without side effects on the stored object. In other words, the stored object is not modified until the result of evaluating the tree of functions is available.

FIG. 1 is a block diagram depicting an example of a system configured as a repository for structured objects. A repository 106 can include a storage engine 108 with a translation component 110, and a storage device 112.

Examples of a repository include database systems such as relational and non-relational databases. In some instances, for example, the repository 106 may include computing nodes configured as a distributed key-value database system. In a key-value database system, a value may be indexed in the repository 106 using a corresponding key value. The value may therefore be stored and retrieved using the key value. Note that in many cases, a key may correspond to a collection of values, rather than a single value.

The storage engine 108 coordinates storing and retrieving data items from the storage device 112. The storage engine 108 may also perform aspects of query processing. A query may specify instructions for storing, retrieving, or modifying one or more of the data items stored on the storage device 112. Aspects of query processing may include those operations, as described herein, that pertain to queries performed on a particular value. For example, an object $O_1$ might be stored in the repository 106 using a key value $K_1$. A query might be performed on the object $O_1$ in which a portion of this accessed.

In the example of FIG. 1, this depicted as an object 102. The object 102 may consist of a hierarchy of sub-objects. For example, the object 102 may comprise a JSON object such as the following: "{address: ["street": "171 Main Street", "zip code": "10101"]}." As seen in this example, an object may comprise additional sub-objects organized as a hierarchy. The hierarchy may have one or more levels. Where the hierarchy has a single level, it may be equivalent to a list, array, or other similar object. Accordingly, the term "hierarchy" encompasses lists, arrays, or other similar objects.

A query of the object Oi may be issued by a client device 100. The query may be represented by a function-based query specification 104. The function-based query specification 104 is distinguished from other forms of query specifications such as those that employ procedural or declarative mechanisms. Structured Query Language ("SQL"), for example, is a declarative language in which a query is expressed as a description of the desired result set. A database component typically translates the description from a declarative statement to a set of procedural instructions. The function-based query specification 104, in contrast, is expressed as a function of one or more parameters. The parameters may themselves consist of functions of additional parameters. Accordingly, the function-based query specification 104 may express a hierarchy of functions.

A translation component 110 of or associated with the storage engine 108 may parse the function-based query specification 104 and cause the functions to be executed in an appropriate order. In the example of FIG. 1, this might mean that functions "f2" and "f3" are evaluated prior to function "f1," since "f1" relies on the return values of "f2" and "f3" as parameter values. In some instances, evaluating the functions may comprise forming a query plan. The query plan may comprise a procedurally oriented set of instructions that will retrieve necessary data from the storage device 112 and evaluate the functions specified in the function-based query specification 104.

Evaluation of the function-based query specification 104 may result in a second object 114. The second object 114 may correspond to the output of the root-level function provided in the function-based query specification 104. In FIG. 1, this would be function "f1." In some instances, the second object 114 may represent a version of the first object 102. The second object 114 could, for example, represent a copy of the first object 102 that has been modified in some way based on evaluation of the functions provided by the function-based query specification 104.

In some instances, the second object 114 might be used to replace the original object 102 in the repository 106. In such cases, the storage engine 108 might obtain a result, corresponding to the output of the top-level function "f1," of evaluating the function-based query specification 104. The result, corresponding to the second object 114, might then be used to replace an existing copy of the object 102. Note that in such cases object 102 might not be transmitted to the client device 100, and could instead be written directly to the storage device 112.

Figure 2:
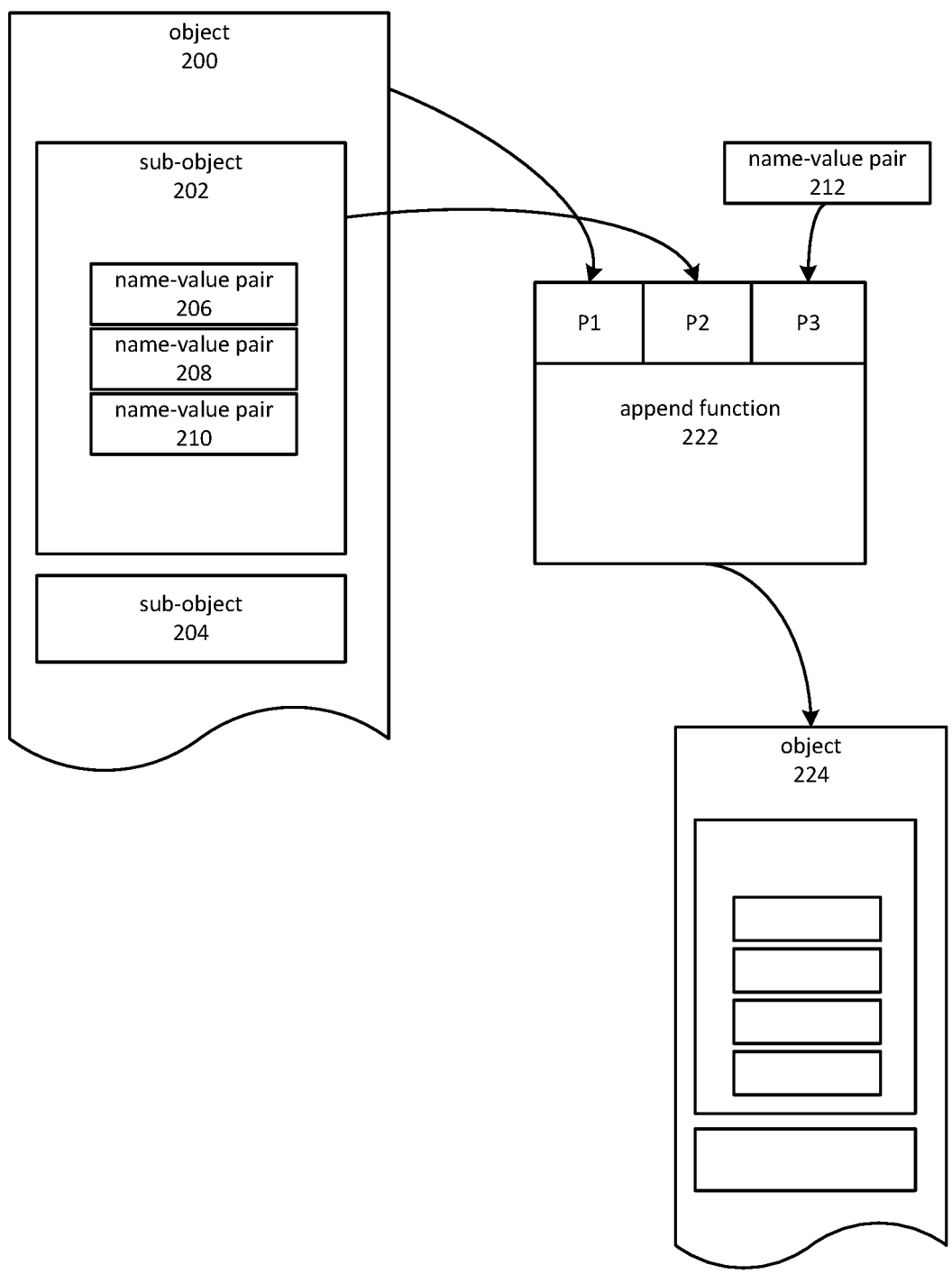
FIG. 2 depicts an example of updating an object using a function-based query.

FIG. 2 depicts an example of updating an object using a function-based query specification. An object 200 may consist of a hierarchy of objects, which may be referred to as sub-objects. By way of example, FIG. 2 depicts sub-objects 202 and 204 as children in an object hierarchy that has another object 200 as a root. Each object may include additional data in a variety of forms, one example of which is the name-value pairs depicted in FIG. 2 as name-value pairs 206-210. In some instances, an object may have a flat hierarchy, as would be the case in a list or array of objects or, equivalently, a list or array of values.

One example of an operation that might be performed on an object—or using the object so that the original object may be treated as immutable—is an append function 222. As depicted by the example of FIG. 2, the append function 222 might be the top-level function in a function-based query specification, the intent of which is to produce a new version of object 200 in which sub-object 202 has been updated to include a new name-value pair 212.

Elements of the object 200 may be mapped to parameters P1, P2, and P3 of the append function 222. The function-based query specification may (explicitly or implicitly) specify the object 200 as parameter P1, sub-object 202 as parameter P2, and name-value pair 212 as parameter P3. The function-based query specification may be expressed in a wide variety of syntaxes. One example, not intended to be limiting, is "APPEND O1.O2, 'X=Y'," where O1 corresponds to object 200, O2 corresponds to sub-object 202, and 'X=Y' corresponds to name-value pair 212. In this example, the mapping of elements of the append function to locations within object 224 is performed using the path syntax "O1.O2" for the object 200 and for a location within the object 200, e.g., sub-object 202. A textual representation is employed to represent the value of parameter P3 as the name-value pair 212.

The output of the append function 222 may be object 224, which as shown is a copy of object 200 that includes copies of sub-objects 202 and 204, and in which name-value pair 212 has been added to the copy of sub-object 202. In some instances, a "SET" function may be provided to store the resulting object 224, possibly replacing a previously stored version of the object 200.

The object 200 (and all sub-objects within it) may be treated as immutable during processing of the append function 222, and during evaluation of other functions in the function-based query specification. In some cases, all processing of the function-based query specification treats the objects or other parameters as immutable.

Figure 3:
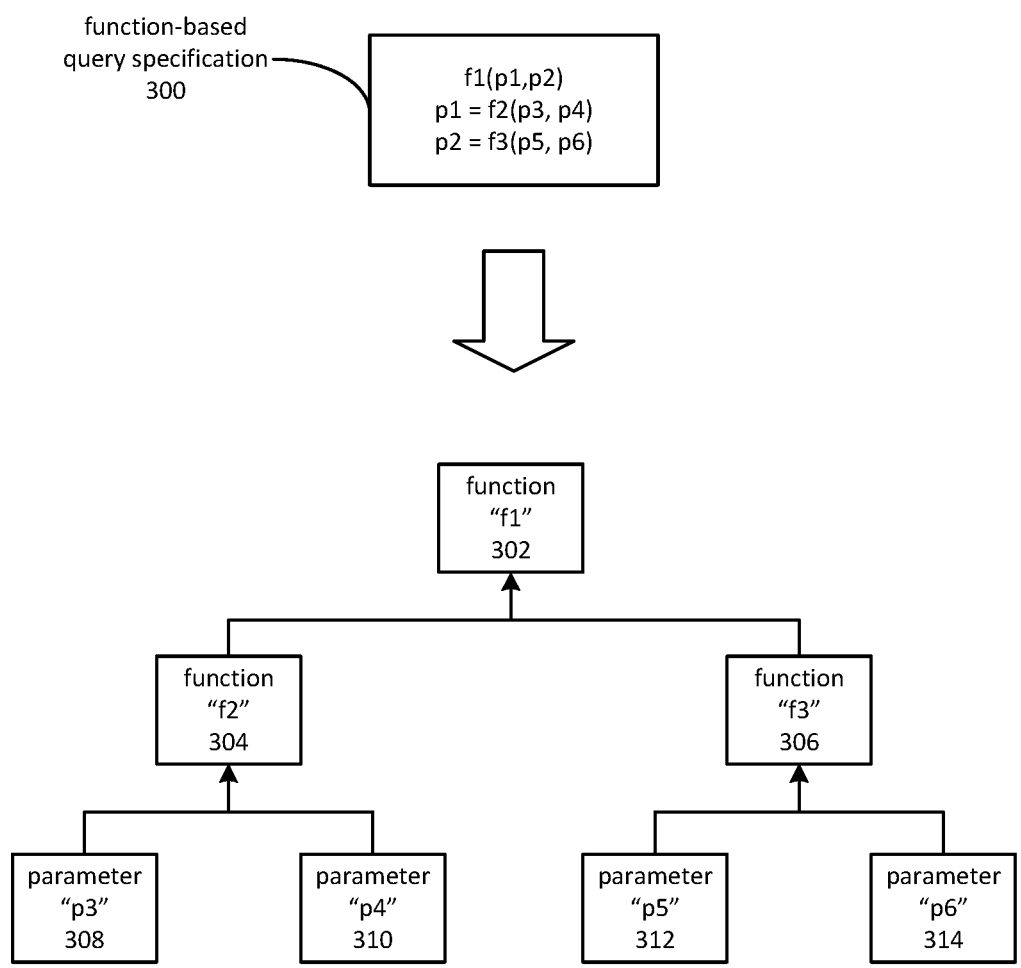
FIG. 3 is diagram depicting evaluation of a hierarchy of functions referenced in a function-based query specification.

By treating the parameters as immutable, evaluation of a function-based query specification has no side effects and parallelism may be employed to improve processing of the query. FIG. 3 is diagram depicting evaluation of a hierarchy of functions referenced in a function-based query specification. In the example depicted by FIG. 3, a function-based query specification 300 may include a top-level function f1 accepting two parameters, p1, and p2. The function-based query specification 300 may specify values for the two parameters in terms of the results of two other functions.

Figure 4:
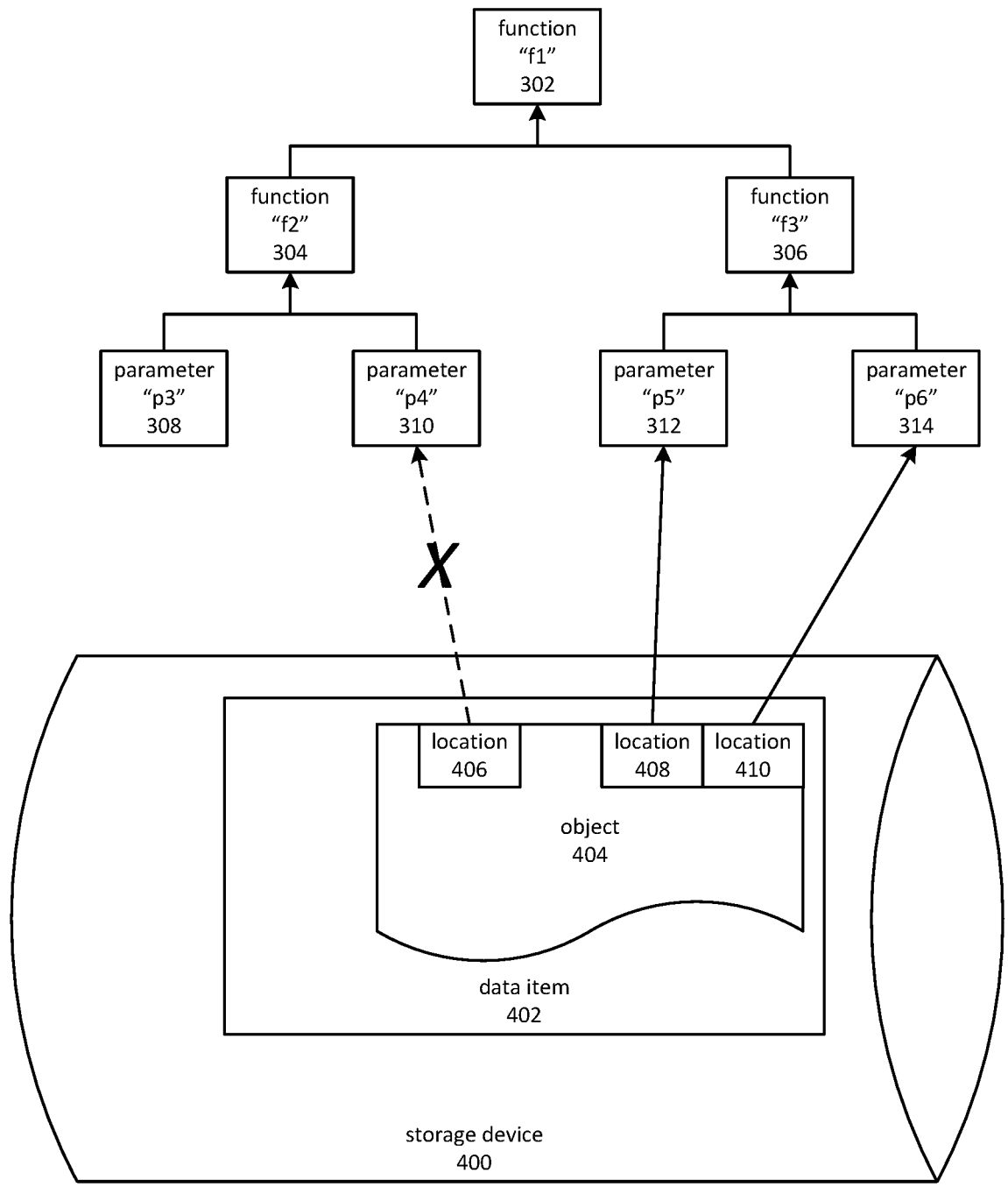
FIG. 4 is a diagram depicting an example of selectively loading subsets of an object during evaluation of a function-based query specification.

Evaluation of the function-based query specification 300 may proceed as depicted in FIG. 3. The parameters "p3"-"p6" 308-314 may be evaluated independently of each other and in parallel. Similarly, functions "f2" and "f3" 304-306 may be evaluated independently of each other and in parallel. Finally function "f1" 302 may be evaluated. Depending on the functions, certain branches of the tree may be pruned. In some instances, the pruning may be used to optimize interaction with a storage device and to increase efficiency regarding the loading of an object's data. FIG. 4 is a diagram depicting an example of selectively loading subsets of an object during evaluation of a function-based query specification 300. Continuing to use the example of the function-based query specification depicted in FIG. 3, during the evaluation of the function-based query specification 300 certain portions of the tree may be pruned. This may be determinable prior to or during evaluation. For example, during evaluation of function "f3" 306, it might be determined that function "f2" does not need to be evaluated. It might then be the case that location 408 of object 404 is retrieved from data item 402 on storage device 400, in order to provide a value for parameter "p5" 312. A location 410 of object 404 might also be retrieved to provide a value for parameter "p6" 314. However, since function "f2" 304 does not need to be evaluated in this example, no value is needed for parameter "p3" 308 and parameter "p4" 310. Accordingly, location 406 does not need to be loaded to provide a value for parameter "p4."

In some instances, embodiments may analyze a function-based query specification to determine whether or not a portion of object 404 should be loaded and the order in which data at the various locations 406-410 should be loaded. For example, a storage engine, such as the storage engine 108 depicted in FIG. 1, might analyze a function-based query specification and form a query plan in which retrieval of portions of the object 404 is prioritized based on the order in which functions "f1"-"f3" 302-306 are to be evaluated.

Figure 5:
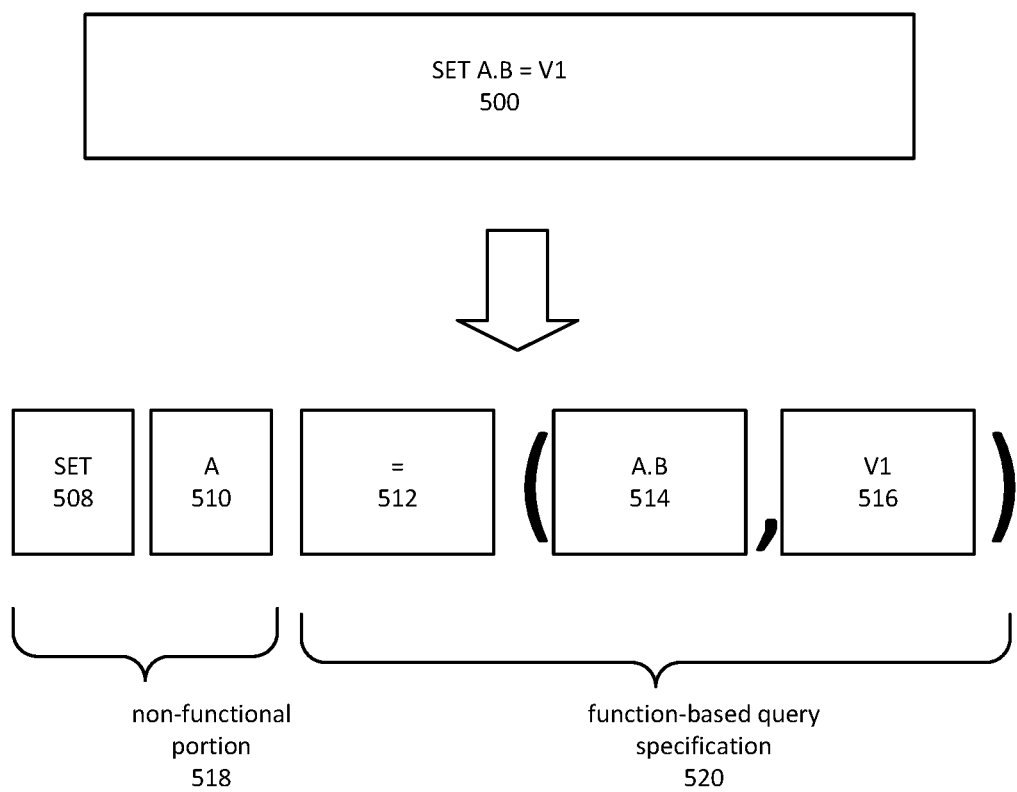
FIG. 5 is a diagram depicting translation of a request to modify an object using a function-based query specification.

FIG. 5 is a diagram depicting translation of a request to modify an object using a function-based query specification. The request might be expressed textually as a command 500 with the text "SET A.B=V1" These command 500 might be parsed, for example by the translation component 110 depicted by FIG. 1, into elements 508-516, which may be separated into a non-functional portion 518 and a function-based query specification 520. In this example, the non-functional portion 518 contains a SET operation 508 and an "A" parameter 510, representing the object "A" whose value is to be set. When performed, the SET operation 508 may replace the object "A" with the result of evaluating the function-based query specification 520. Since the SET operation 508 has a side-effect of modifying a stored version of an object, the SET operation may be considered to be procedural rather than functional.

The function-based query specification 520 may be formed from the original command 500 to have the "=" function 512 as a top-level function of the function-based query specification 520. The parameters supplied to the "=" function 512 may be the "A.B" parameter 514 and the "V1" parameter 516. The return value of the "=" function 512 may be a copy of object "A" (not shown), which the SET operation 508 may store on a storage device in place of the original version of the object "A." The copy, in this case, would be one in which the element at location "A.B" was replaced by "V1."

Figure 6:
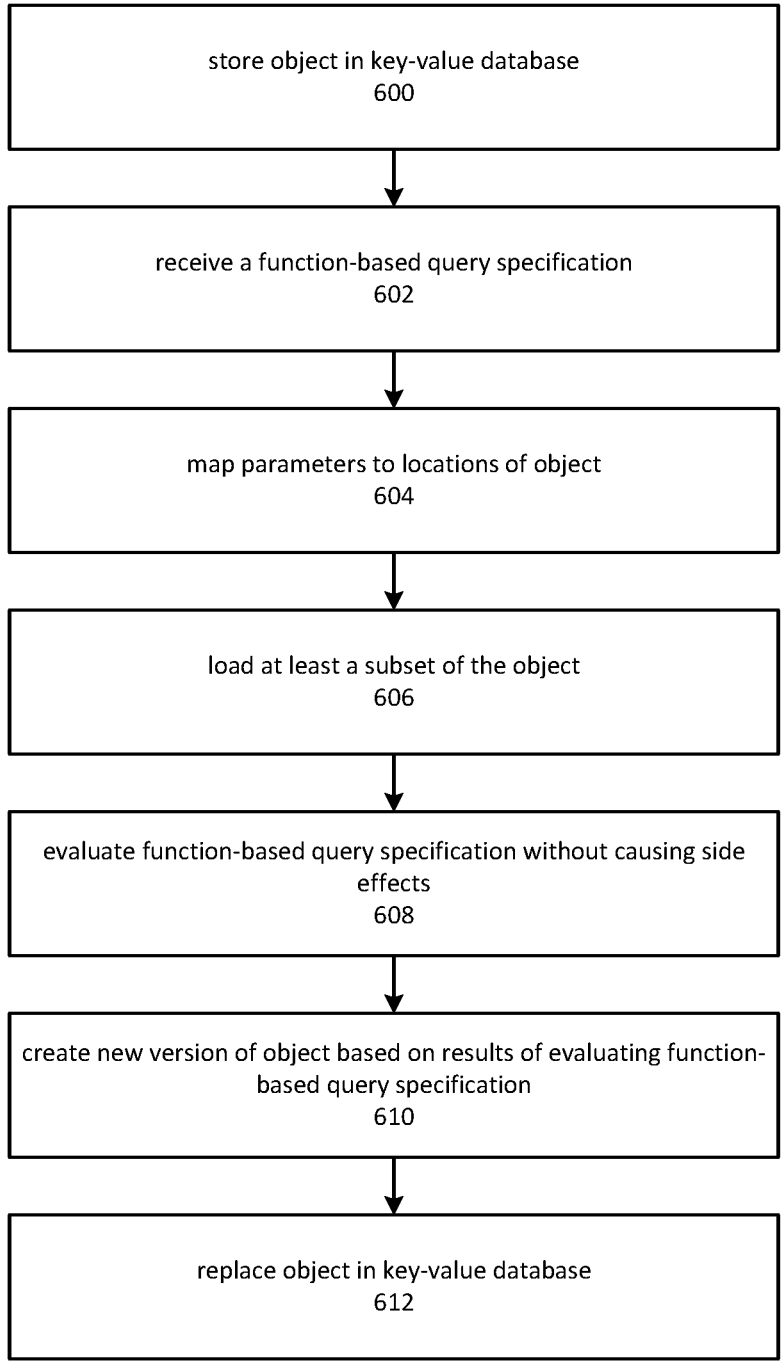
FIG. 6 is a flow diagram depicting storing and updating of an object stored in a key-value database.

The technique depicted in FIG. 5 may be used to store and update objects, such as JSON objects or other structured or semi-structured data types, to be maintained in a key-value database. FIG. 6 is a flow diagram depicting storing and updating of an object stored in a key-value database. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

As depicted by block 600, embodiments may store an object in a key-value database. For example, the storage engine 108 depicted in FIG. 1 may process a SET operation. The SET operation may be supplied with parameters including a key value and one or more values, including the object, that are to be stored in association with the key. As noted, the object may be a JSON object or other structured or semi-structured type, such as Extensible Markup Language ("XML") files, arrays of values, and so on. Note that embodiments may map between parameters to the functions specified in the function-based query specification and locations within the object. The object, therefore, may typically have sufficient structure—such as name-value pairs, node names, and so forth—to complete the mapping between parameters and portions of the object.

Block 602 depicts the storage engine receiving a function-based query specification. The function-based query specification may be included in another command, such as a SET operation. There may be some elements, such as a SET operation, that have side effects. The storage engine may exclude these elements where appropriate, so that the functional elements of the command may be processed as a function-based query specification. In some instances, the storage engine may raise an error if the command includes elements that have side effects and cannot be separated from the function-based elements of the command. FIG. 5 depicts aspects of separating procedural and functional elements to form a function-based query specification.

Block 604 depicts mapping from parameters to locations of an object. The storage engine 108, possibly in combination with the translation component 110, may identify terms used in the function-based query specification and match them to locations in the object. For example, the function-based query specification may refer to locations in the object by using a path syntax such as "A.B", a name-value syntax such as "name=value," and so on.

The query engine may then, as depicted by block 606, cause at least a subset of the object to be loaded into memory. FIG. 4 depicts aspects of determining which portions of an object to load. In some instances, the entire object may be loaded into memory rather than selective portions of the object.

Figure 7:
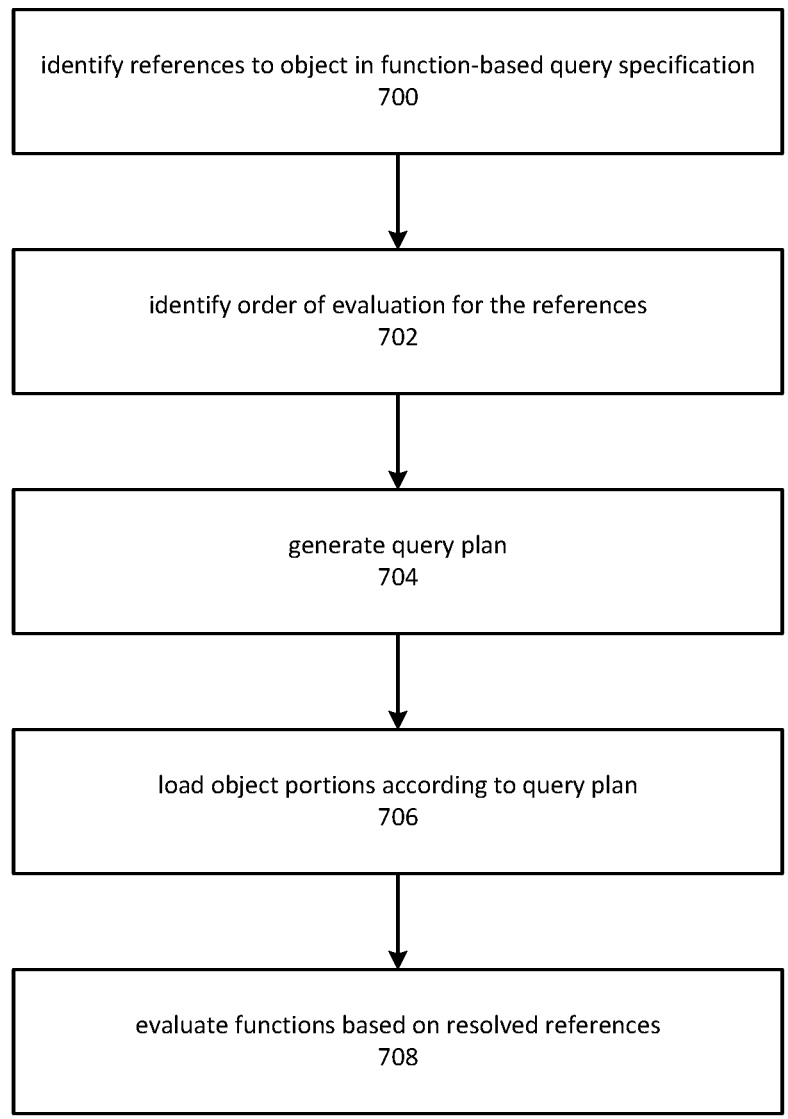
FIG. 7 is a flow diagram depicting evaluation of a function-based query specification.

Block 608 depicts evaluating the function-based query specification without causing side effects. Here, the term "side effects" may refer to changes to the object or other item stored in the database. FIG. 7 depicts additional aspects of evaluating the function-based query specification.

Black 610 depicts forming a new version of the object based on the previous version and the results of evaluating the function-based query specification. The new version of the object may, in some cases, be formed by loading a copy of the previous version of the object into memory and replacing regions of the object with the result of evaluating the function-based query specification.

Block 612 depicts replacing the object in the key-value database. The object may be replaced with the new version of the object that was based on the results of evaluating the function-based query specification. This may, in some cases, be a wholesale replacement, although various other techniques may be employed. Note that the original version of the stored object is typically not changed until evaluation of the function-based query specification is completed. However, in some cases, various optimizations may be employed to allow updating of the object in parallel with evaluating the function-based query specification. If such optimizations are employed, embodiments may ensure that evaluation of the function-based query specification remains without side effects, especially in the event of error conditions.

In some cases, rather than replace an existing object, the results of evaluating the function based query may be applied to a new object that is to be stored in a key-value database. The new object may be stored as a version of the prior object, or as an entirely new object. In some cases, the new object may have a different structure than the original object. In one example, the new object is stored by executing a set command in which a key value provided as a parameter to the set command is different than the key value associated with the original object. When the command is executed, storage engine 108 may cause the new version of the object to be stored, such as on the storage device 112 of the repository 106.

FIG. 7 is a flow diagram depicting evaluation of a function-based query specification. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 700 depicts identifying references to objects within a function-based query specification. This may be done, for example, by the translation component 110 depicted in FIG. 1. Typically, the function-based query specification is parsed into tokens and a grammar is applied to identify references to paths.

As depicted by block 702, embodiments may then identify an order of evaluation for the references. The storage engine 108, in some cases, may use the translation component 110 to determine the order. An example of an evaluation order is provided by FIG. 3. The order generally reflects the nesting of functions specified in the query. Nested functions are typically evaluated in bottom-up fashion, so that the innermost functions are evaluated first and the outermost functions are evaluated last. There may, however, be cases were the order is modified in order to improve evaluation efficiency.

At block 704, the storage engine and/or a query optimizer may generate a query plan. This may include generating instructions that, when executed, cause some or all of the object to be loaded into memory, as depicted by block 706. The order of the instructions may be based on the order in which references to portions of the object are to be evaluated. For example, an instruction to load a portion of an object needed by the first parameter to be evaluated might be ordered prior to an instruction to load a second portion of the object needed by the last parameter to be evaluated. The query plan may also include instructions that cause later instructions to load portions of the object to be skipped if those portions are no longer needed to evaluate the functions.

Next, as depicted by block 708, the functions in the function-based query specification may be evaluated by the storage engine based on resolving references to portions of the object. In other words, values may be assigned to a parameter of a function by mapping from the parameters to a corresponding object location. The data at the mapped location may be used to set the parameter's value, and then used to evaluate the result of the function.

Figure 8:
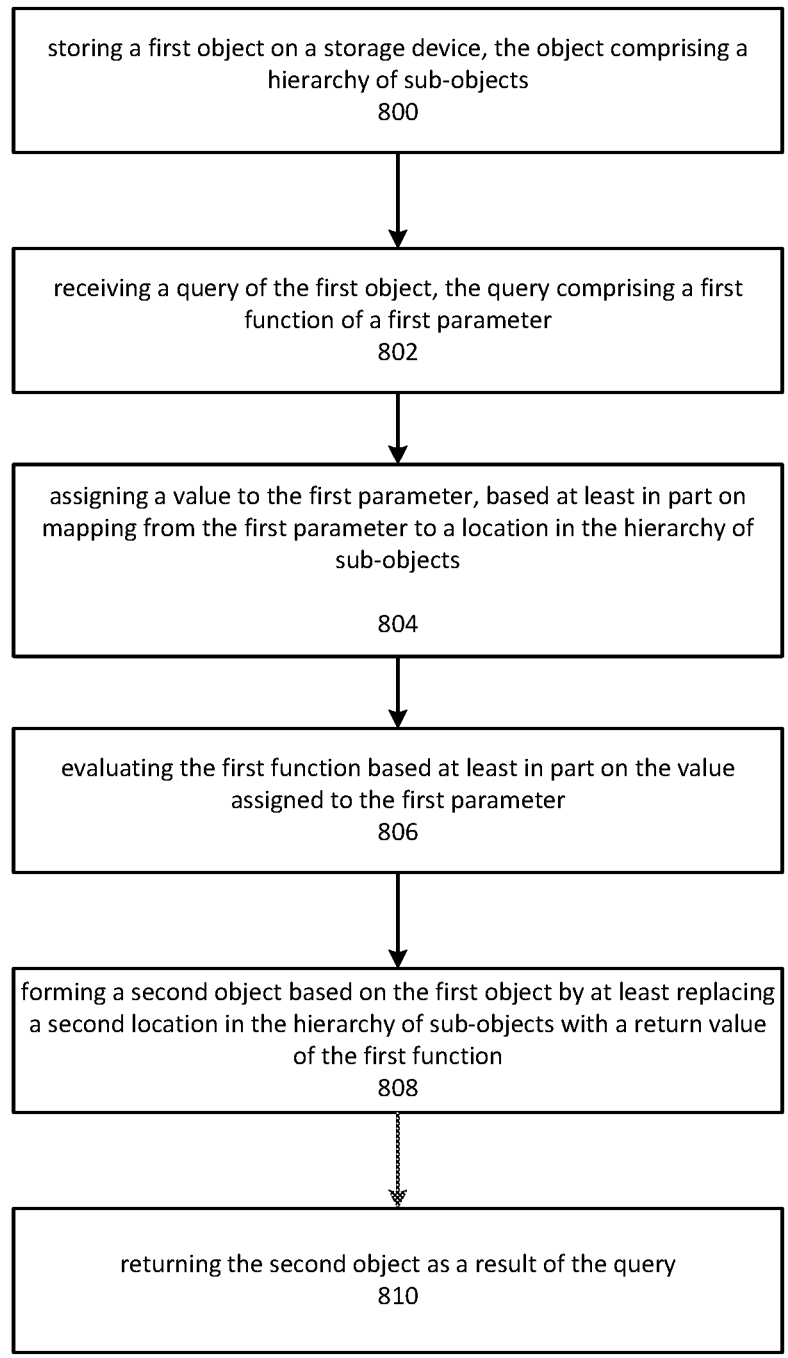
FIG. 8 is a flow diagram depicting evaluation of a general-purpose function-based query specification.

The techniques disclosed herein may be employed in conjunction with general-purpose queries, which can include projections and transformations of objects and sub-objects, filtering and selecting of sub-objects, and so forth. FIG. 8 is a flow diagram depicting evaluation of a general-purpose function-based query specification. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 800 depicts storing a first object on a storage device, where the object comprises a hierarchy of sub-objects. For example, a JSON object may be stored with other values in a data item index by a key, within a collection of key-value pairs.

Block 802 depicts receiving a query of the first object, where the query comprises a first function of a first parameter. The parameter might, for example, be a path referring to the location of a sub-object within the object. The function may have any number of parameters, of various types. Some parameters may be references to locations within the object, while others might be constants, literals, expressions, other functions, and so forth. The query may be expressed in various syntaxes. The query might also include a non-functional portion, which may be evaluated separately from the functional portion.

Block 804 depicts assigning a value to the first parameter, based at least in part on mapping from the first parameter to a location in the hierarchy of sub-objects. The mapping may be implied (for example, the object itself may sometimes be implied when no path is present), or explicitly provided. A path to the location may, for example, be provided as a parameter value, which is then substituted with a value at that location prior to evaluating the function. Note that this is equivalent to providing a function that explicitly resolves a path reference to a value at the corresponding location in the object.

Block 806 depicts evaluating the first function based at least in part on the value assigned to the first parameter. The nature of the evaluation may depend on the nature of function. For example, evaluating a function can comprise identifying an order of evaluating the functions, pushing copies of parameter values onto a stack, computing a return value using the pushed parameters, and pushing the return value onto the stack. Note that this approach avoids side effects, since only copies of objects are acted upon during evaluation.

Block 808 depicts forming a second object. The second object may be formed based on the first object by at least replacing a second location in the hierarchy of sub-objects with a return value from the first function. As noted, these operations are performed on copies of the object, so the first object itself is treated as immutable during this operation.

The operation depicted by block 808 depicts the second object being formed by the operation of an additional function which might perform an insert, append, replace, or other similar on the object. Conditional operations, sometimes referred to as conditional operators, may also be applied while forming the additional function. In some instances, this function might be explicitly represented in the query, while in other instances it might be implied. In either case, the results of this function, the second object, may be returned or otherwise used as the result of the query. This is depicted by block 810.

Figure 9:
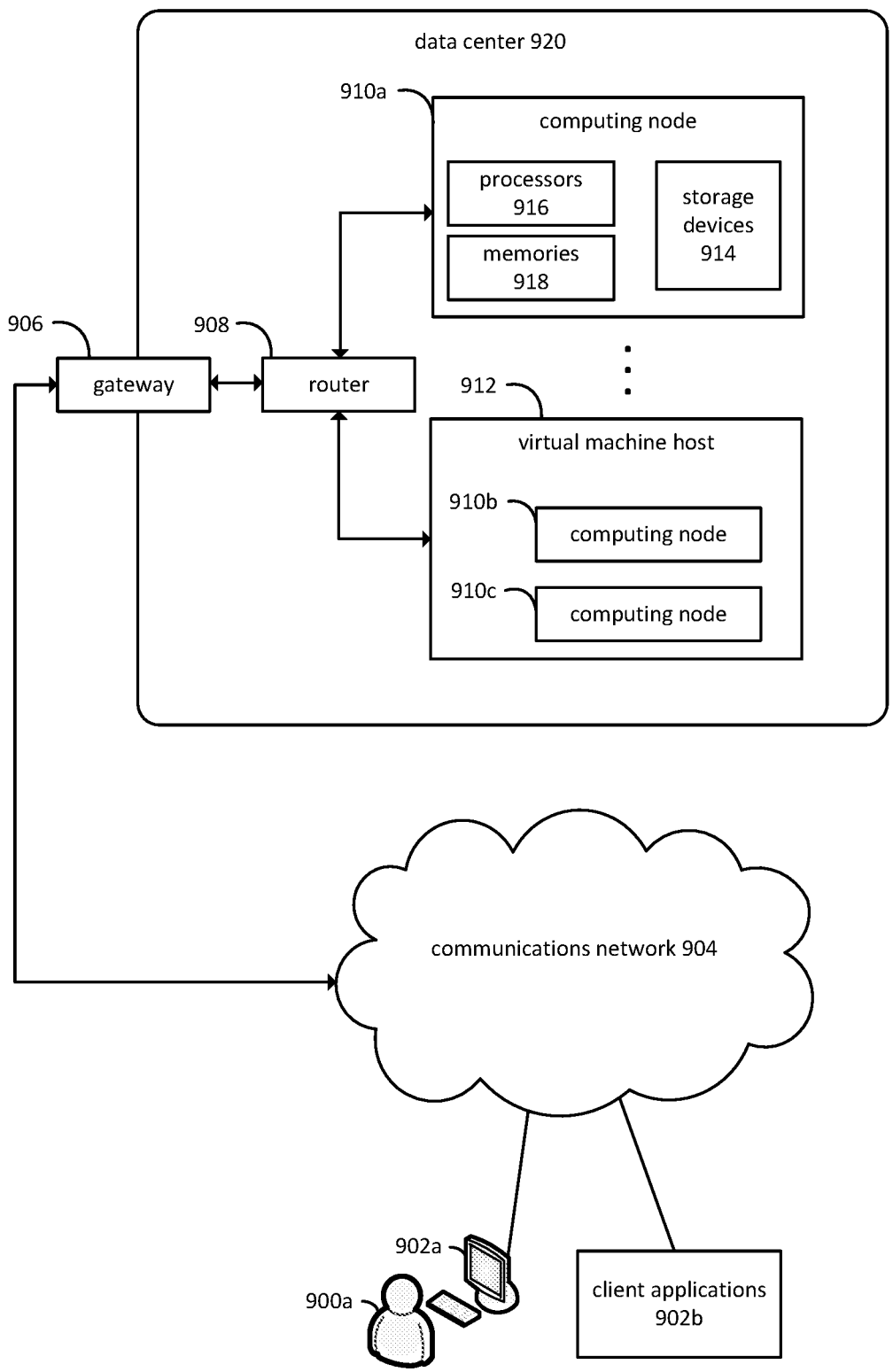
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900a may interact with various client applications, operating on any type of computing device 902a, to communicate over communications network 904 with processes executing on various computing nodes 910a, 910b, and 910c within a data center 920. Alternatively, client applications 902b may communicate without user intervention. Communications network 904 may comprise any combination of communications technology, including the Internet, wired and wireless local area networks, fiber optic networks, satellite communications, and so forth. Any number of networking protocols may be employed.

Communication with processes executing on the computing nodes 910a, 910b, and 910c, operating within data center 920, may be provided via gateway 906 and router 908. Numerous other network configurations may also be employed. Although not explicitly depicted in FIG. 9, various authentication mechanisms, web service layers, business objects, or other intermediate layers may be provided to mediate communication with the processes executing on computing nodes 910a, 910b, and 910c. Some of these intermediate layers may themselves comprise processes executing on one or more of the computing nodes. Computing nodes 910a, 910b, and 910c, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910a is depicted as residing on physical hardware comprising one or more processors 916, one or more memories 918, and one or more storage devices 914. Processes on computing node 910a may execute in conjunction with an operating system or alternatively may execute as a bare-metal process that directly interacts with physical resources, such as processors 916, memories 918, or storage devices 914.

Computing nodes 910b and 910c are depicted as operating on virtual machine host 912, which may provide shared access to various physical resources, such as physical processors, memory, and storage devices. Any number of virtualization mechanisms might be employed to host the computing nodes.

The various computing nodes depicted in FIG. 9 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in non-virtualized form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. A virtualization-based computing node therefore also encompasses the physical hardware needed to execute the virtualization resources. A computing node may be configured to execute an operating system as well as one or more application programs. In some embodiments, a computing node might also comprise bare-metal application programs.

Figure 10:
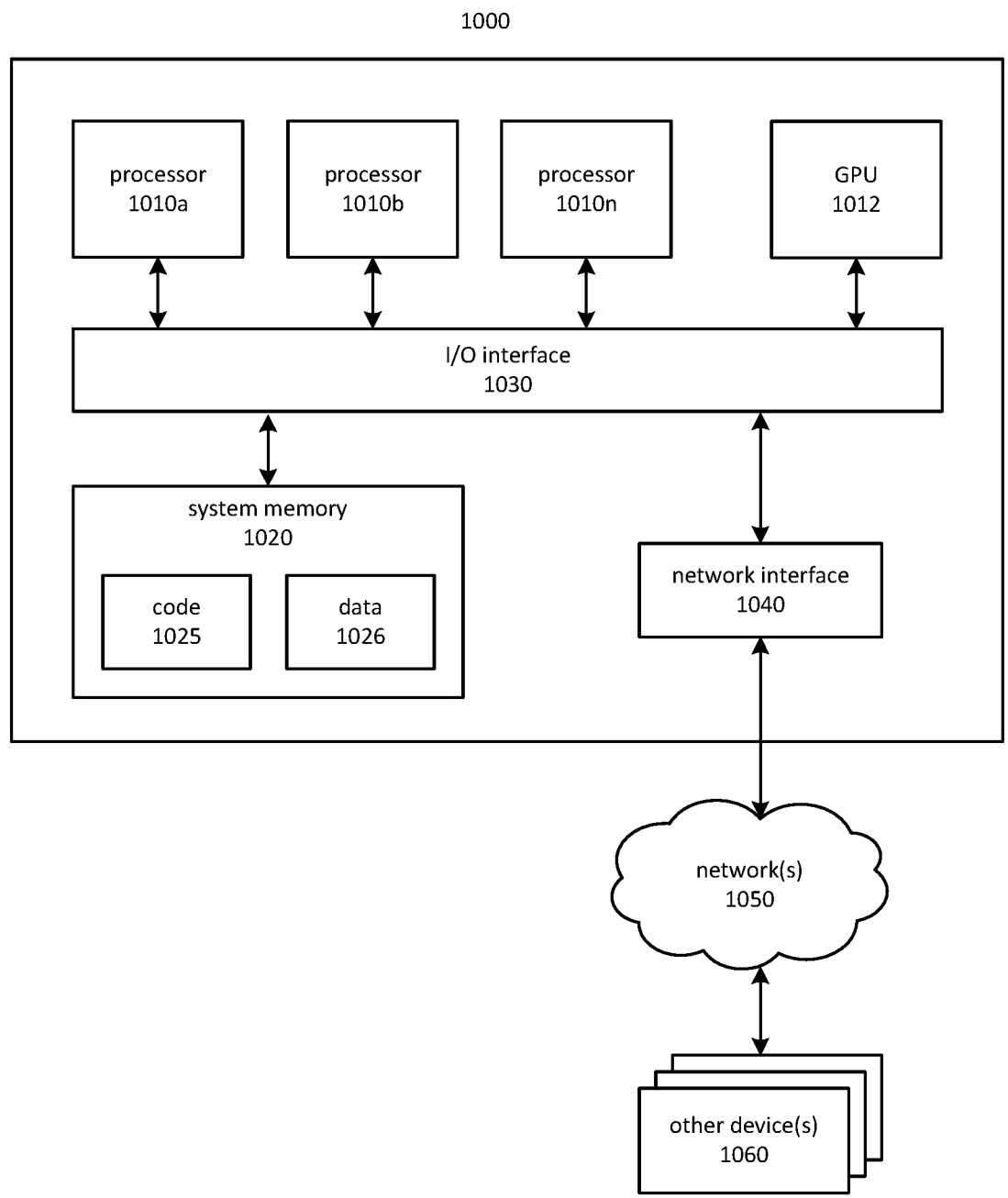
FIG. 10 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. In the illustrated embodiment, computing device 1000 includes one or more processors 1010a, 1010b, and/or 1010n (which may be referred herein singularly as a processor 1010 or in the plural as the processors 1010) coupled to a system memory 1020 via an input/output ("I/O") interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1010 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 1010 and GPU 1012 may be implemented as one or more of the same type of device.

System memory 1020 may be configured to store instructions and data accessible by processor(s) 1010. In various embodiments, system memory 1020 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1020 as code 1025 and data 1026.

In one embodiment, I/O interface 1030 may be configured to coordinate I/O traffic between processor 1010, system memory 1020, and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect ("PCI") bus standard or the Universal Serial Bus ("USB") standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for updating objects maintained in a repository of key-value data, the system comprising:
   one or more computing nodes comprising the repository of key-value data, the one or more computing nodes comprising instructions that, in response to execution by a processor of the one or more computing nodes, cause the system at least to:
      store a first object comprising a hierarchy of sub-objects in the repository of key-value data;
      receive a first request to modify the first object, the first request comprising a first function of one or more parameters;
      assign a value to a first parameter of the one or more parameters, the value based at least in part on mapping from the first parameter to a first location in the hierarchy of sub-objects;
      evaluate the first function based at least in part on the value assigned to the first parameter;
      form a second object based on a copy of the first object by at least replacing, in the copy of the first object, a second location in the hierarchy of sub-objects with a return value of the first function; and
      replace the first object in the repository of key-value data with the second object.

2. The system of claim 1, wherein the hierarchy of sub-objects is represented as a collection of name-value pairs.

3. The system of claim 1, wherein the first object is not modified by evaluation of the first function.

4. The system of claim 1, wherein the one or more computing nodes comprise further instructions that, upon execution by the processor, cause the system at least to:
   retrieve a subset of the first object from storage based on the mapping from the first parameter to the first location in the hierarchy of sub-objects, wherein the subset comprises the first location.

5. The system of claim 1, wherein evaluation of the first function does not cause a side effect on the first object, based at least in part on the first object is stored in the repository of key-value data.

6. A method, comprising:
   storing, on a storage device, a first object comprising a hierarchy of sub-objects;
   receiving, by at least one processor, a request to change the first object, the first object comprising a first function of at least a first parameter;
   assigning, by the at least one processor, a value to the first parameter, the value based at least in part on mapping from the first parameter to a first location in the hierarchy of sub-objects;
   evaluating the first function based at least in part on the value assigned to the first parameter;
   forming a second object based on a copy of the first object by at least replacing, in the copy of the first object, a second location in the hierarchy of sub-objects with a return value of the first function; and
   replacing the first object with the second object.

7. The method of claim 6, further comprising:
   retrieving a subset of the first object based on the mapping from the first parameter to the first location in the hierarchy of sub-objects, wherein the subset comprises the first location.

8. The method of claim 6, wherein the first object is treated as immutable, based at least in part the second object being formed on the copy of the first object.

9. The method of claim 6, further comprising:
   returning the second object as a result of a query.

10. The method of claim 6, wherein evaluation the first function has no side effects based at least in part on the first object being stored.

11. The method of claim 6, wherein the first object is not changed by evaluating the first function.

12. The method of claim 6, wherein the hierarchy of sub-objects comprises a plurality of name-value pairs.

13. The method of claim 6, further comprising:
   identifying an additional function having a return value associated with at least one parameter of the first function; and
   evaluating the additional function in parallel.

14. A non-transitory computer-readable storage medium comprising instructions that, in response to execution by one or more computing devices, cause the one or more computing devices at least to:
   store a first object comprising a hierarchy of sub-objects;
   receive a first request to modify the first object, the first request comprising a first function of at least a first parameter;
   assign a value to the first parameter, the value based at least in part on mapping from the first parameter to a first location in the hierarchy of sub-objects;
   evaluate the first function based at least in part on the value assigned to the first parameter;
   form a second object based on a copy of the first object by at least replacing, in the copy of the first object, a second location in the hierarchy of sub-objects with a result from the first function; and
   replace the first object with the second object.

15. The non-transitory computer-readable storage medium of claim 14, comprising further instructions that, in response to execution by the one or more computing devices, cause the one or more computing devices to at least:
   retrieve a subset of the first object based on the mapping from the first parameter to the first location in the hierarchy of sub-objects, wherein the subset comprises the first location.

16. The non-transitory computer-readable storage medium of claim 14, wherein the first parameter of the first function corresponds to an additional function of an additional parameter.

17. The non-transitory computer-readable storage medium of claim 16, wherein the additional function is evaluated prior to the first function, and an output of the additional function is suppled as an input to the first function.

18. The non-transitory computer-readable storage medium of claim 14, wherein the first object is not modified based on evaluation of the first function.

19. The non-transitory computer-readable storage medium of claim 14, wherein the first object is a JavaScript Object Notation object.

20. The non-transitory computer-readable storage medium of claim 14, comprising further instructions that, in response to execution by one or more computing devices, cause the one or more computing devices to at least:

cause the second object to be returned in response to a query.

\* \* \* \* \*